US011317250B2

(12) United States Patent
Kim et al.

(10) Patent No.: US 11,317,250 B2
(45) Date of Patent: Apr. 26, 2022

(54) METHOD FOR TRANSMITTING MBMS INTEREST INDICATION MESSAGE BY TERMINAL AND DEVICE SUPPORTING SAME

(71) Applicant: LG ELECTRONICS INC., Seoul (KR)

(72) Inventors: Sangwon Kim, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 283 days.

(21) Appl. No.: 16/316,191

(22) PCT Filed: Jul. 7, 2017

(86) PCT No.: PCT/KR2017/007295
§ 371 (c)(1),
(2) Date: Aug. 11, 2020

(87) PCT Pub. No.: WO2018/012810
PCT Pub. Date: Jan. 18, 2018

(65) Prior Publication Data
US 2021/0037347 A1    Feb. 4, 2021

Related U.S. Application Data

(60) Provisional application No. 62/360,931, filed on Jul. 11, 2016.

(51) Int. Cl.
*H04W 4/06*    (2009.01)
*H04B 17/318*    (2015.01)
(Continued)

(52) U.S. Cl.
CPC ............ *H04W 4/06* (2013.01); *H04B 17/318* (2015.01); *H04W 24/02* (2013.01); *H04W 76/11* (2018.02); *H04W 76/27* (2018.02)

(58) Field of Classification Search
CPC ............ H04W 24/02; H04W 36/0005; H04W 36/0007; H04W 36/0009; H04W 36/30;
(Continued)

(56) References Cited

U.S. PATENT DOCUMENTS 10,447,489 B2 * 10/2019 Sharma ............. H04W 72/1215
2009/0253435 A1 * 10/2009 Olofsson ........... H04W 72/0406
455/450
(Continued)

FOREIGN PATENT DOCUMENTS

EP    3001744 A1    3/2016
WO    2014/182105 A1    11/2014
(Continued)

*Primary Examiner* — Jean A Gelin
(74) *Attorney, Agent, or Firm* — Dentons US LLP

(57) ABSTRACT

Disclosed are a method for transmitting an MBMS interest indication message and a device supporting same. A method for transmitting an MBMS interest indication message, according to an embodiment of the present invention, comprises the steps of: deciding a coverage enhancement (CE) level of a terminal in a wireless communication system; receiving CE level information of an MBMS service of interest; comparing the decided CE level of the terminal and the received CE level information of the MBMS service and thus determining whether or not the MBMS service can be received; and, if it is determined that the MBMS service can be received, transmitting to a base station an MBMS interest indication message comprising information about an MBMS frequency of interest or an MBMS service of interest.

5 Claims, 11 Drawing Sheets

(51) Int. Cl.
*H04W 76/11* (2018.01)
*H04W 76/27* (2018.01)
*H04W 24/02* (2009.01)

(58) Field of Classification Search
CPC ..... H04W 48/12; H04W 48/10; H04W 48/16; H04W 48/20; H04W 72/005; H04W 72/0453; H04W 76/27; H04W 4/06; H04W 4/70; H04W 76/11; H04W 76/40; H04B 17/318; H04L 12/189; H04L 5/001; H04L 5/0053
See application file for complete search history.

(56) References Cited

U.S. PATENT DOCUMENTS

| | | | | |
|---|---|---|---|---|
| 2012/0213142 | A1* | 8/2012 | Van Lieshout | H04W 72/121 |
| | | | | 370/312 |
| 2013/0215817 | A1* | 8/2013 | Lu | H04L 67/22 |
| | | | | 370/312 |
| 2013/0294320 | A1* | 11/2013 | Jactat | H04W 48/12 |
| | | | | 370/312 |
| 2014/0022976 | A1* | 1/2014 | Chao | H04W 4/021 |
| | | | | 370/312 |
| 2014/0112236 | A1* | 4/2014 | Jung | H04W 36/0007 |
| | | | | 370/312 |
| 2014/0140237 | A1* | 5/2014 | Ma | H04W 24/08 |
| | | | | 370/252 |
| 2014/0161020 | A1* | 6/2014 | Jung | H04W 48/20 |
| | | | | 370/312 |
| 2014/0177506 | A1* | 6/2014 | Korus | H04W 4/06 |
| | | | | 370/312 |
| 2014/0301210 | A1* | 10/2014 | Kim | H04W 24/10 |
| | | | | 370/241 |
| 2014/0355507 | A1* | 12/2014 | Amerga | H04W 48/20 |
| | | | | 370/312 |
| 2015/0043445 | A1 | 2/2015 | Xiong et al. | |
| 2015/0124686 | A1* | 5/2015 | Zhang | H04W 88/08 |
| | | | | 370/312 |
| 2016/0014571 | A1* | 1/2016 | Lee | H04W 4/06 |
| | | | | 370/312 |
| 2016/0192376 | A1* | 6/2016 | Lee | H04W 72/0406 |
| | | | | 370/252 |
| 2016/0212595 | A1* | 7/2016 | Fukuta | H04W 4/06 |
| 2016/0374050 | A1* | 12/2016 | Prasad | H04L 12/1868 |
| 2017/0188334 | A1* | 6/2017 | Zeng | H04W 72/005 |
| 2017/0196022 | A1* | 7/2017 | Yi | H04W 72/14 |
| 2017/0265086 | A1* | 9/2017 | Worrall | H04W 76/40 |
| 2017/0295005 | A1* | 10/2017 | Lee | H04W 48/12 |
| 2018/0110043 | A1* | 4/2018 | Shi | H04L 5/0044 |

FOREIGN PATENT DOCUMENTS

| | | |
|---|---|---|
| WO | 2015/057028 A1 | 4/2015 |
| WO | 2015/116732 A1 | 8/2015 |

\* cited by examiner

METHOD FOR TRANSMITTING MBMS INTEREST INDICATION MESSAGE BY TERMINAL AND DEVICE SUPPORTING SAME

BACKGROUND OF THE INVENTION

Field of the Invention

The present invention relates to a technique in which a UE transmits a multimedia broadcast multicast service (MBMS) interest indication message indicating whether an MBMS service can be received.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a UE as an upper-level requirement.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Meanwhile, a UE is configured to transmit an MBMS interest indication message to a network with respect to an MBMS service of interest. However, according to the conventional technique, it is not decided whether the UE can successfully receive the MBMS service via a given channel in practice. Accordingly, there is a case where the UE cannot receive a corresponding MBMS service even if the UE has transmitted the MBMS interest indication message. There is a need for a technical solution for solving such a problem to smoothly provide the MBMS service.

SUMMARY OF THE INVENTION

In order to prevent a UE from not being able to receive a corresponding multimedia broadcast multicast service (MBMS) service even if the UE has transmitted an MBMS interest indication message, there is a need for a technique in which whether the UE can receive the MBMS service is decided and the decision result is transmitted to a base station.

According to an embodiment of the present invention, there is provided a method of transmitting an MBMS interest indication message by a user equipment (UE) in a wireless communication system. The method may include: determining a coverage enhancement (CE) level of the UE; receiving CE level information of an MBMS service of interest; deciding whether the MBMS service can be received, by comparing the determined CE level of the UE and the CE level information of the MBMS service; and transmitting to a base station the MBMS interest indication message including information on an MBMS frequency of interest or the MBMS service of interest if it is decided that the MBMS service can be received.

The method may further include, before performing the transmitting, determining the MBMS service, which is decided to be receivable, as the MBMS service of interest, or determining a frequency, at which the MBMS service is provided, as the MBMS frequency of interest.

If the CE level of the UE is lower than the CE level information of the MBMS service, in the deciding, it may be decided that the MBMS service can be received.

The method may further include performing a handover or RRC connection establishment procedure with respect to a cell which has transmitted the CE level information of the MBMS service.

If the CE level of the UE is higher than the CE level information of the MBMS service, in the deciding, it may be decided that the MBMS service cannot be received.

The CE level of the UE may be determined based on reference signal received power (RSRP) measured in the UE.

The CE level information of the MBMS service may be provided for each MBMS service, TMGI, MBSFN area, or G-RNTI.

The CE level information of the MBMS service may be transmitted via an MCCH or SC-MCCH channel.

According to another embodiment of the present invention, there is provided a method of transmitting an MBMS interest indication message by a user equipment (UE) in a wireless communication system. The method may include: predicting a prepetition transmission count of the UE; receiving a repetition transmission count corresponding to an MBMS service of interest; deciding whether the MBMS service can be received, by comparing the predicted repetition transmission count of the UE and the received repetition transmission count of the MBMS service; and transmitting to a base station the MBMS interest indication message including information on an MBMS frequency of interest or the MBMS service of interest if it is decided that the MBMS service can be received.

The method may further include, before performing the transmitting, determining the MBMS service, which is decided to be receivable, as the MBMS service of interest, or determining a frequency, at which the MBMS service is provided, as the MBMS frequency of interest.

If the repetition transmission count of the UE is greater than the repetition transmission count of the MBMS service, in the deciding, it may be decided that the MBMS service can be received.

The method may further include performing a handover or RRC connection establishment procedure with respect to a cell which has transmitted the CE level information of the MBMS service.

The repetition transmission count of the MBMS service may be provided for each MBMS service, TMGI, MBSFN area, or G-RNTI.

The repetition transmission count of the MBMS service may be transmitted via an MCCH or SC-MCCH channel.

According to another embodiment of the present invention, there is provided a user equipment (UE) for transmitting an MBMS interest indication message in a wireless communication system. The UE may include: a memory; a transceiver; and a processor for coupling the memory and the transceiver. The processor may be configured to: determine a CE level of the UE; receive CE level information of an MBMS service of interest; decide whether the MBMS service can be received, by comparing the determined CE level of the UE and the CE level information of the MBMS service; and transmit to a base station the MBMS interest indication message including information on an MBMS frequency of interest or the MBMS service of interest if it is decided that the MBMS service can be received.

Since whether a UE can receive a multimedia broadcast multicast service (MBMS) service is decided in advance on the basis of a coverage enhancement (CE) level and/or a repetition transmission count, an unnecessary handover and radio resource control (RRC) connection establishment operation can be avoided, and the MBMS service can be smoothly received.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
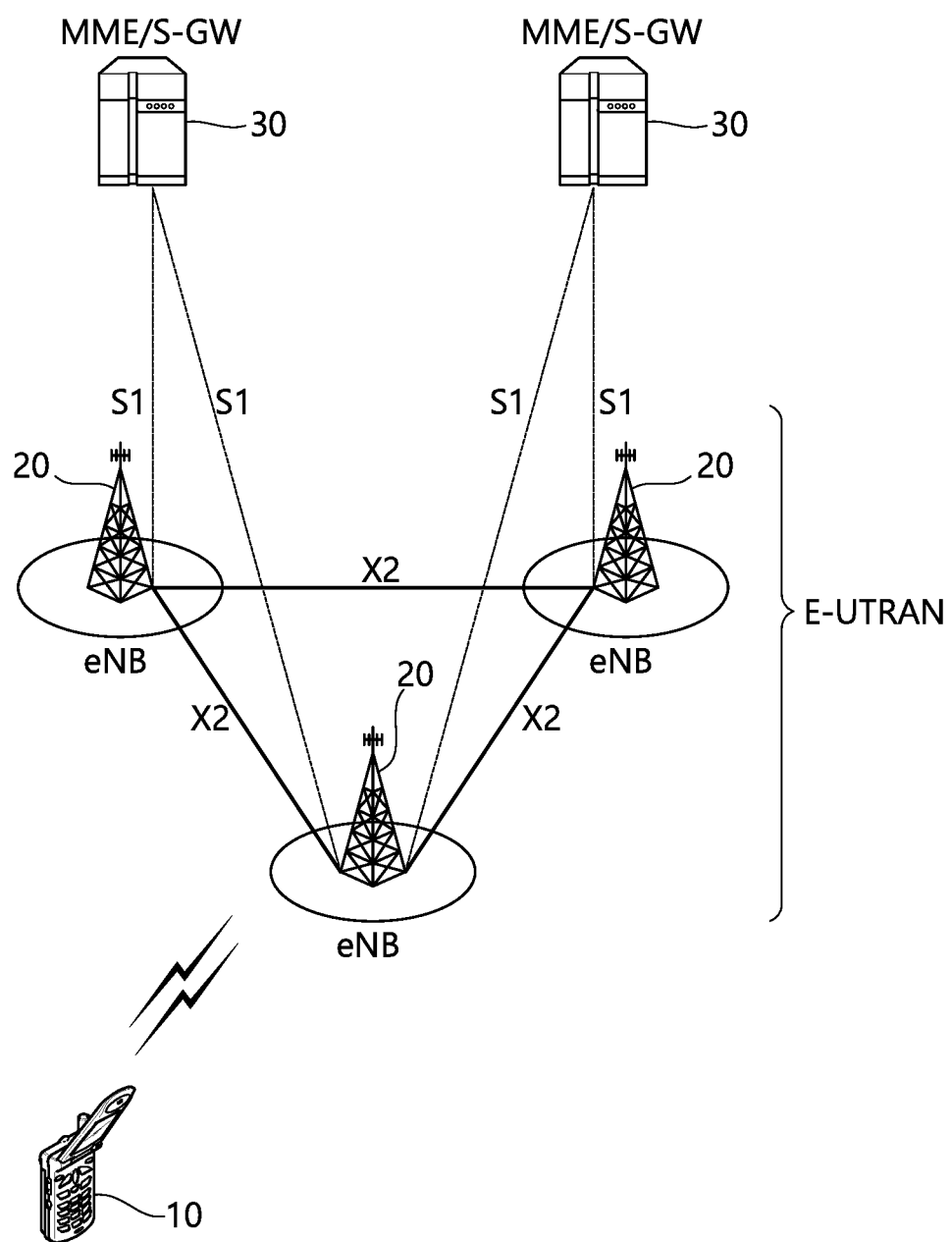
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
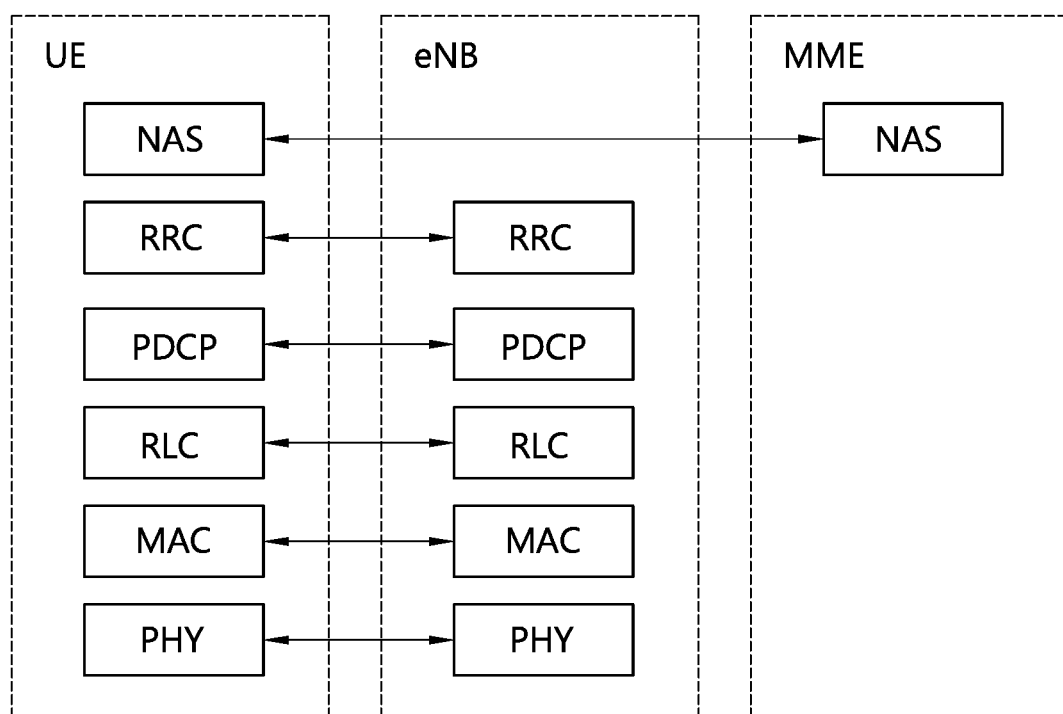
FIG. 2 shows a block diagram of a control plane protocol stack of an LTE system.
Figure 3:
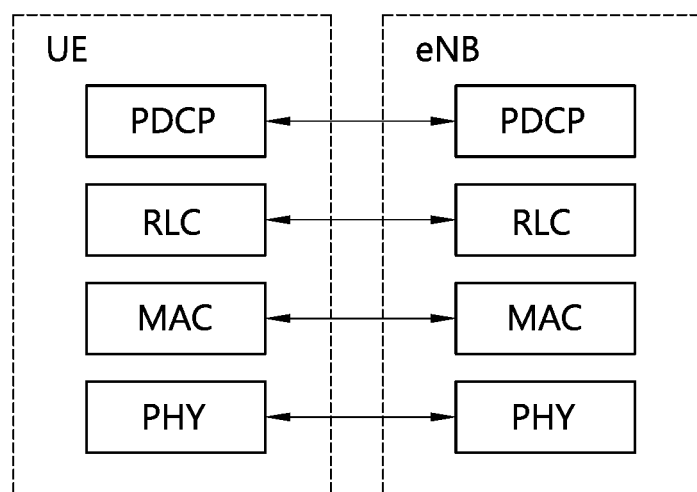
FIG. 3 shows a block diagram of a user plane protocol stack of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer belongs to an upper layer of the RRC layer and serves to perform session management, mobility management, or the like.

In order to manage the mobility of the UE in the NAS layer positioned on the control planes of the UE and the MME, an EPS mobility management (EMM) registered state and an EMM deregistered state may be defined. The EMM registered state and the EMM deregistered state may be applied to the UE and the MME. Like a case of turning on the power of the UE for the first time, an initial UE is in the EMM deregistered state and the UE performs a process of registering the UE in the corresponding network through an initial attach procedure in order to access the network. When the attach procedure is successfully performed, the UE and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Figure 4:
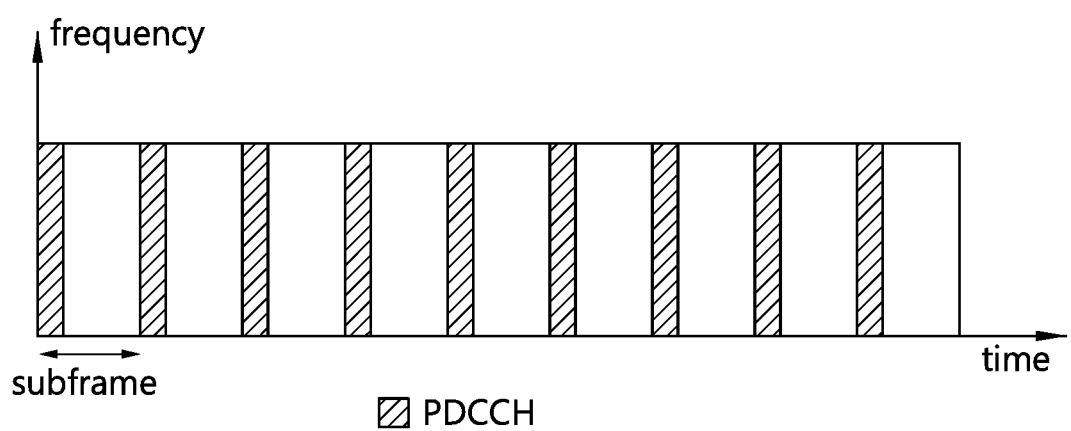
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Multimedia broadcast multicast services (MBMS) are described.

Figure 5:
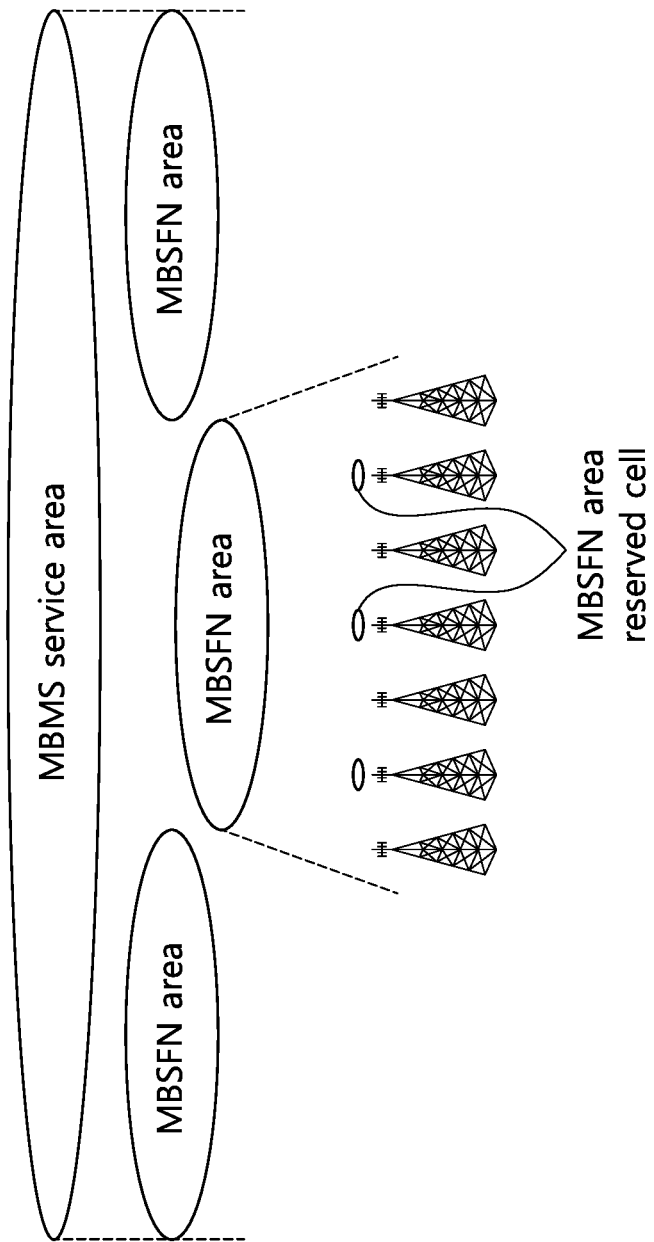
FIG. 5 shows MBMS definitions.

FIG. 5 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

Transmission of a MBMS in E-UTRAN uses either MBSFN transmission or SC-PTM transmission. The MCE makes the decision on whether to use SC-PTM or MBSFN for each MBMS session.

Single-cell transmission of MBMS is characterized by:
 MBMS is transmitted in the coverage of a single cell;
 One SC-MCCH and one or more SC-MTCH(s) are mapped on DL-SCH;
 Scheduling is done by the eNB;
 SC-MCCH and SC-MTCH transmissions are each indicated by a logical channel specific RNTI on PDCCH (there is a one-to-one mapping between TMGI and G-RNTI used for the reception of the DL-SCH to which a SC-MTCH is mapped);
 A single transmission is used for DL-SCH (i.e. neither blind HARQ repetitions nor RLC quick repeat) on which SC-MCCH or SC-MTCH is mapped;
 SC-MCCH and SC-MTCH use the RLC-UM mode.

For each SC-MTCH, the following scheduling information is provided on SC-MCCH:
SC-MTCH scheduling cycle;
SC-MTCH on-duration: duration in downlink subframes that the UE waits for, after waking up from DRX, to receive PDCCHs. If the UE successfully decodes a PDCCH indicating the DL-SCH to which this SC-MTCH is mapped, the UE stays awake and starts the inactivity timer;
SC-MTCH inactivity-timer: duration in downlink subframes that the UE waits to successfully decode a PDCCH, from the last successful decoding of a PDCCH indicating the DL-SCH to which this SC-MTCH is mapped, failing which it re-enters DRX. The UE shall restart the inactivity timer following a single successful decoding of a PDCCH.

Meanwhile, the SC-PTM reception opportunities are independent of the unicast DRX scheme.

NOTE 2: The SC-MTCH inactivity-timer may be set to 0.

NOTE 3: Although the above parameters are per SC-MTCH (i.e. per MBMS service), the network may configure the same scheduling pattern for multiple SC-MTCHs (i.e. multiple MBMS services).

Multi-cell transmission of MBMS is characterized by:
Synchronous transmission of MBMS within its MBSFN Area;
Combining of MBMS transmission from multiple cells is supported;
Scheduling of each MCH is done by the MCE;
A single transmission is used for MCH (i.e. neither blind HARQ repetitions nor RLC quick repeat);
A single Transport Block is used per TTI for MCH transmission, that TB uses all the MBSFN resources in that subframe;
MTCH and MCCH can be multiplexed on the same MCH and are mapped on MCH for p-t-m transmission;
MTCH and MCCH use the RLC-UM mode;
The MAC subheader indicates the LCID for MTCH and MCCH;
The MBSFN Synchronization Area, the MBSFN Area, and the MBSFN cells are semi-statically configured e.g. by O&M;
MBSFN areas are static, unless changed by O&M (i.e. no dynamic change of areas);

The UE is not required to receive services from more than one MBSFN Area simultaneously and may support only a limited number of MTCHs.

Hereinafter, single-cell point-to-multipoint (SC-PTM) transmission is described.

A transmission method of an MBMS service includes SCPTM transmission and multimedia broadcast multicast service single frequency network (MBSFN) transmission. While identifiable signals are transmitted simultaneously in a plurality of cells in case of the MBSFN transmission, the MBMS service is transmitted in a single cell in case of the SCPTM transmission. Therefore, unlike in the MBSFN transmission, synchronization between cells is not necessary in the SCPTM transmission. Further, the SCPTM transmission directly uses the existing PDSCH, and thus has a unicast feature unlike in the MBSFN transmission. That is, a plurality of UEs read the same PDCCH, and acquire an RNTI for each service to receive an SCPTM service. An SCPTM-dedicated MCCH is introduced, and if it is decided that a service desired by the UE is an SCPTM service via the MCCH, the UE may acquire a corresponding RNTI value and read a PDCCH through a corresponding RNTI to receive the SCPTM service.

Meanwhile, SIB13 includes information required to acquire MBMS control information associated with one or more MBSFN areas. Table 1 shows an element included in the SIB13.

TABLE 1

```
-- ASN1START
SystemInformationBlockType13-r9 ::=   SEQUENCE {
    mbsfn-AreaInfoList-r9       MBSFN-AreaInfoList-r9,
    notificationConfig-r9       MBMS-NotificationConfig-r9,
    lateNonCriticalExtension    OCTET STRING
        OPTIONAL,
    ...
}
-- ASN1STOP
```

In Table 1, notificationConfig denotes an MBMS notification associated with a configuration parameter. The UE may ignore this field if dl-Bandwidth included in MasterInformationBlock is set to n6.

In addition, MBSFN-AreaInfoList includes information required to acquire MBMS control information associated with one or more MBSFN areas. Table 2 shows an element included in MBSFN-AreaInfoList.

TABLE 2

```
-- ASN1START
MBSFN-AreaInfoList-r9 ::=       SEQUENCE (SIZE(1..maxMBSFN-Area)) OF MBSFN-AreaInfo-r9
MBSFN-AreaInfo-r9 ::=           SEQUENCE {
    mbsfn-AreaId-r9                 MBSFN-AreaId-r12,
    non-MBSFNregionLength           ENUMERATED {s1, s2},
    notificationIndicator-r9        INTEGER (0..7),
    mcch-Config-r9                  SEQUENCE {
        mcch-RepetitionPeriod-r9        ENUMERATED {rf32, rf64, rf128, rf256},
        mcch-Offset-r9                  INTEGER (0..10),
        mcch-ModificationPeriod-r9      ENUMERATED {rf512, rf1024},
        sf-AllocInfo-r9                 BIT STRING (SIZE(6)),
        signallingMCS-r9                ENUMERATED {n2, n7, n13, n19}
    },
    ...
}
-- ASN1STOP
```

In Table 2, signallingMCS denotes an MCS applicable to each (P)MCH configured for an MBSFN area and a subframe indicated by an sf-AllocInfo field, with respect to a first subframe allocated to the (P)MCH within each MCH scheduling period. The MCH scheduling period includes MCH scheduling information provided by MAC.

An MBMS interest indication is described. This procedure aims to inform an E-UTRAN about that a UE is interested in receiving an MBMS via an MBMS wireless bearer (MRB) or is receiving the MBMS, and if so, to inform the E-UTRAN about information on a priority right of the MBMS with respect to unicast reception.

Figure 6:
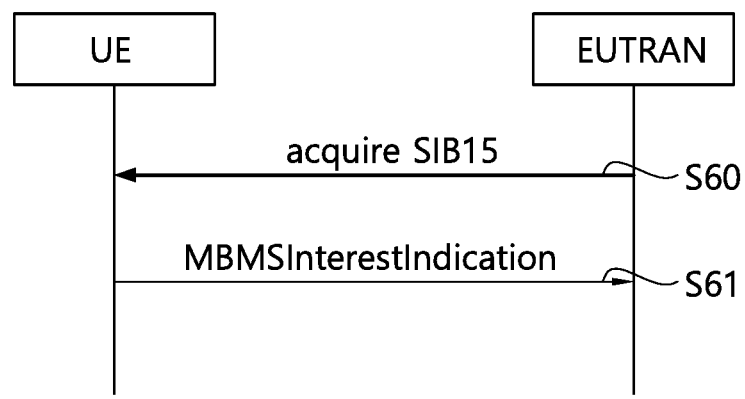
FIG. 6 shows an MBMS interest indication procedure.

FIG. 6 shows an MBMS interest indication procedure. An MBMS capable UE in an RRC_CONNECTED state may start the procedure in some cases, for example, when a connection is successfully established, when moving into or out of a service area, when the connection starts or stops, when an interest is changed, when a priority is changed between MBMS reception and unicast reception, or when there is a change in a primary cell (PCell) for broadcasting SystemInformationBlockType15.

When the above procedure starts, the UE operates as follows:

1> If SystemInformationBlockType15 is broadcast by a PCell in step S60;
2> It is confirmed that the UE has a valid version of the SystemInformationBlockType15 for the PCell;
2> If the UE does not transmit an MBMSInterestIndication message after entering an RRC_CONNECTED state lastly; or
2> If the UE transmits the MBMSInterestIndication message after the last time, the UE is connected to a PCell which does not broadcast the SystemInformationBlockType15;
3> If a set of MBMS interest frequencies is not empty;
4> The UE starts transmission of the MBMSInterestIndication message;
2> Alternatively;
3> If there is a change in a set of the MBMS interest frequencies after last transmission of the MBMSInterestIndication message; or
3> If reception of all indicated MBMS frequencies is prioritized over reception of any established unicast bearers, after last transmission of the MBMSInterestIndication message;
4> The UE starts transmission of the MBMSInterestIndication message.

In order for the network to be prevented from allocating an MBMS reception refusal configuration, the UE may transmit the MBMSInterestIndication message even if the UE is capable of receiving MBMS services of interest.

In order to determine MBMS interest frequencies, the UE operates as follows:

1> The UE regards one frequency as part of the MBMS interest frequencies if the following conditions are met:
2> If at least one MBMS session that the UE is receiving or intends to receive through MRB is continuously being used or is about to start (The UE may determine whether the session is continuously being used from a start or end time indicated in a user service description (USD)); and
2> For at least one of these MBMS sessions, if the SystemInformationBlockType15 acquired from the PCell includes one or more MBMS service area identifiers (SAIs) indicated in the USD for the session (The UE may regard a corresponding frequency as part of the MBMS interest frequencies even if an E-UTRAN cannot (temporarily) use the MRB for the interest session. That is, the UE does not verity whether the session is displayed on an MCCH); and
2> If the UE is capable of receiving the set of MBMS interest frequencies simultaneously irrespective of whether a service cell is set for each of the frequencies; and
2> If supportedBandCombincation included in UE-EUTRA-Capability by the UE includes at least one band combination including the set of MBMS interest frequencies.

In addition, in order to determine the MBMS interest services, the UE operates as follows:

1> If the MBMS service meets the following condition, it is regarded as part of the MBMS service of interest.
2> The UE is SC-PTM capable;
2) The UE is receiving or interested in receiving this service via SC-MRB;
2> One session of this service is ongoing or is about to start. 2> One or more MBMS SAIs of a USD for this service is included in SystemInformationBlockType15 acquired from a PCell for a frequency belonging to an MBMS frequency set of interest.

The indicating of the frequency means that the UE supports to acquire SystemInformationBlockType13 for the interest frequency. That is, such an indication shall be irrelevant to whether a service cell is configured on a corresponding frequency. When the UE evaluates frequencies capable of simultaneous transmission, the UE does not consider currently configured service frequencies. That is, the UE considers only MBMS frequencies for which the UE intends to perform reception. The term frequency does not refer to a physical frequency, and covers associated band(s). This means that additional bands may be displayed at SystemInformationBlockType11 (i.e., service frequency) or SystemInformationBlockType15 (i.e., neighboring frequencies).

The UE may configure content of the MBMSInterestIndication message:

1> If the set of MBMS interest frequencies is empty;
2> The UE allows to include mbms-FreqList, and if applicable, configures the mbms-FreqList to include MBMS interest frequencies by using an E-UTRA absolute radio frequency channel number (EARFCN) corresponding to freqBandIndicator included in SystemInformationBlockType1 and EARFCN(s) included in SystemInformationBlockType15. The mbms-FreqList indicates only physical frequencies at which the UE intends to perform reception, and does not mean that the UE supports an associated band.
2> If the UE prioritizes reception of all indicated MBMS frequencies over reception of any one of unicast bearers, the UE allows to include mbms-Priority. If the UE prioritizes MBMS reception and cannot support unicast data due to congestion on MBMS carrier(s), the E-UTRAN may start to release the unitcast bearers. Whether all bearers are to be released or whether only GBR bearers are to be released depends on an E-UTRAN implementation issue. Even if the congestion is mitigated, the E-UTRAN does not start re-establishment of the released unicast bearers.

The UE may transmit an MBMSInterestIndication message to lower layers for performing transmission. Accordingly, in step S61, the UE transmits the MBMSInterestIndication message to the E-UTRAN.

Figure 7:
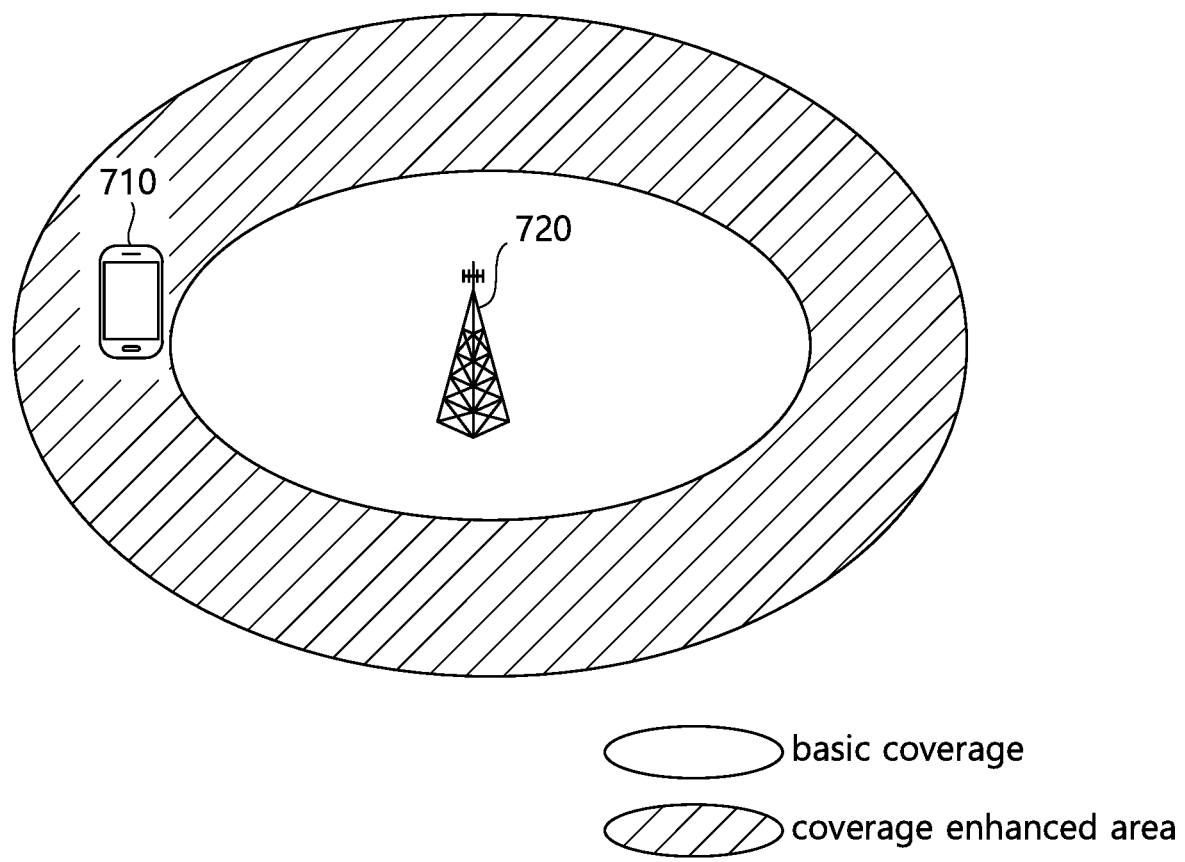
FIG. 7 shows an example of cell coverage enhancement.

FIG. 7 shows an example of cell coverage enhancement.

Recently, there is ongoing discussion on various coverage enhancement schemes such as a repetitive transmission method for a UE 710 for each channel/signal. A coverage enhancement level (hereinafter, a CE level) may vary depending on a UE location in a cell and signal quality of the UE in the cell. A difference of the CE level implies that a repetition count (resource, subframe) required for successful uplink transmission and downlink reception is different. From a UE perspective, in terms of power consumption, it is preferable to reside in a cell which requires a fewer repetition for successful uplink transmission and downlink reception. The fewer reception for successful uplink transmission and downlink reception may be more necessary, in particular, for an MTC UE. The MTC UE indicates a wireless device providing MTC communication. The MTC communication indicates information exchange between MTC UEs via a BS without human interaction or information exchange between the MTC UE and the MTC service via the BS. From a network perspective, it is also preferable to serve a UE requiring a fewer repetition.

It is assumed in the present invention that a plurality of CE levels are present for a measurement including a level corresponding to a case where there is no coverage enhancement. According to the CE level, it is assumed that a repetition count required for successful uplink transmission and downlink reception is different. The repetition count may be an amount of resources required for successful uplink transmission and downlink reception, and may be the number of subframes required for successful uplink transmission and downlink reception. A CE level 0 corresponds to the case where there is no coverage enhancement. The repetition count, resource amount, or the number of subframes required for successful uplink transmission and downlink reception may increase in proportion to an increase in the CE level.

The UE may determine the CE level for transmission/reception in a specific cell through the following method, and each threshold may be provided by a serving cell.

(1) RSRP/RSRQ-based CE level determination: The UE may determine a CE level of a cell by comparing a measured RSRP/RSRQ result and a predetermined threshold.

A network may set an RSRP/RSRQ threshold for one or more CE levels in order for the UE to determine the CE level in a specific cell. For example, the network may signal a 0th RSRP/RSRQ threshold for identifying a CE level 0 and a CE level 1, a $1^{st}$ RSRP/RSRQ threshold for identifying the CE level 1 and a CE level 2, and a $2^{nd}$ RSRP/RSRQ threshold for identifying the CE level 2 and a CE level 3. The level 0 implies that there is no coverage enhancement for the measurement.

While measuring a serving cell and a neighboring cell, the UE may determine the CE level by comparing a threshold determined by a network and an RSRP/RSRQ result measured by the UE. If the measurement result is lower than the $0^{th}$ RSRP/RSRQ threshold, the UE may determine the CE level to 0. If the measurement result is lower than the $1^{st}$ RSRP/RSRQ threshold and higher than the $0^{th}$ RSRP/RSRQ threshold, the UE may determine the CE level to 1. If the measurement result is lower than the $2^{nd}$ RSRP/RSRQ threshold and higher than the $1^{st}$ RSRP/RSRQ threshold, the UE may determine the CE level to 2. Likewise, if the measurement result is higher than the $2^{nd}$ RSRP/RSRQ threshold, the UE may determine the CE level to 3.

(2) PSS (Primary Synchronization Signal)/SSS(Secondary Synchronization Signal)-based CE level determination: The UE may determine a CE level of a cell by comparing a time for acquiring PSS/SSS and a predetermined threshold.

A network may set a time threshold for one or more CE levels in order for the UE to determine the CE level in a specific cell. For example, the network may signal a $0^{th}$ time threshold for identifying a CE level 0 and a CE level 1, a $1^{st}$ time threshold for identifying the CE level 1 and a CE level 2, and a $2^{nd}$ time threshold for identifying the CE level 2 and a CE level 3. The level 0 implies that there is no coverage enhancement for the measurement.

While measuring a serving cell and a neighboring cell, the UE may determine the CE level by comparing a time threshold determined by a network and a time for acquiring PSS/SSS. If the time for acquiring the PSS/SSS is shorter than the time $0^{th}$ threshold, the UE may determine the CE level to 0. If the time for acquiring the PSS/SSS is longer than the $1^{st}$ time threshold and shorter than the $0^{th}$ time threshold, the UE may determine the CE level to 1. If the time for acquiring the PSS/SSS is longer than the $2^{nd}$ time threshold and shorter than the $1^{st}$ time threshold, the UE may determine the CE level to 2. Likewise, if the time for acquiring the PSS/SSS is longer than the $2^{nd}$ time threshold, the UE may determine the CE level to 3.

(3) Downlink message-based CE level determination: The UE may determine a CE level of a cell by comparing a predetermined threshold and a repetition count required to successfully receive a certain downlink message.

(4) Uplink message-based CE level determination: The UE may determine a CE level of a cell by comparing a predetermined threshold and a repetition count required to successfully transmit a certain uplink message.

Although it is assumed in the present description that the CE level can be set to 0 to 3, this merely means that one or more levels can be set, and the present invention is not limited thereto.

Meanwhile, SC-PTM specified in 3GPP release 13 supports multi-cast downlink transmission in NB-IoT, that is, firmware or software update, group message transfer, or the like. Hereinafter, an improvement issue required to support an NPDCCH and a narrowband operation such as coverage extension/repetition transmission will be introduced.

In order to prevent a UE from not being able to receive a corresponding MBMS service in practice even if the UE has transmitted an MBMS interest indication message, there is a need for a technique in which whether the UE can receive the MBMS service is decided and the decision result is transmitted to a BS. Specifically, the UE which is interested in receiving the MBMS service via MBSFN transmission or SC-PTM transmission may decide whether the MBMS service can be received based on a CE level of the MBMS service and a CE level of the UE. Thereafter, the UE may determine an MBMS interest frequency and/or an MBMS interest service on the basis of the decision result.

Figure 8:
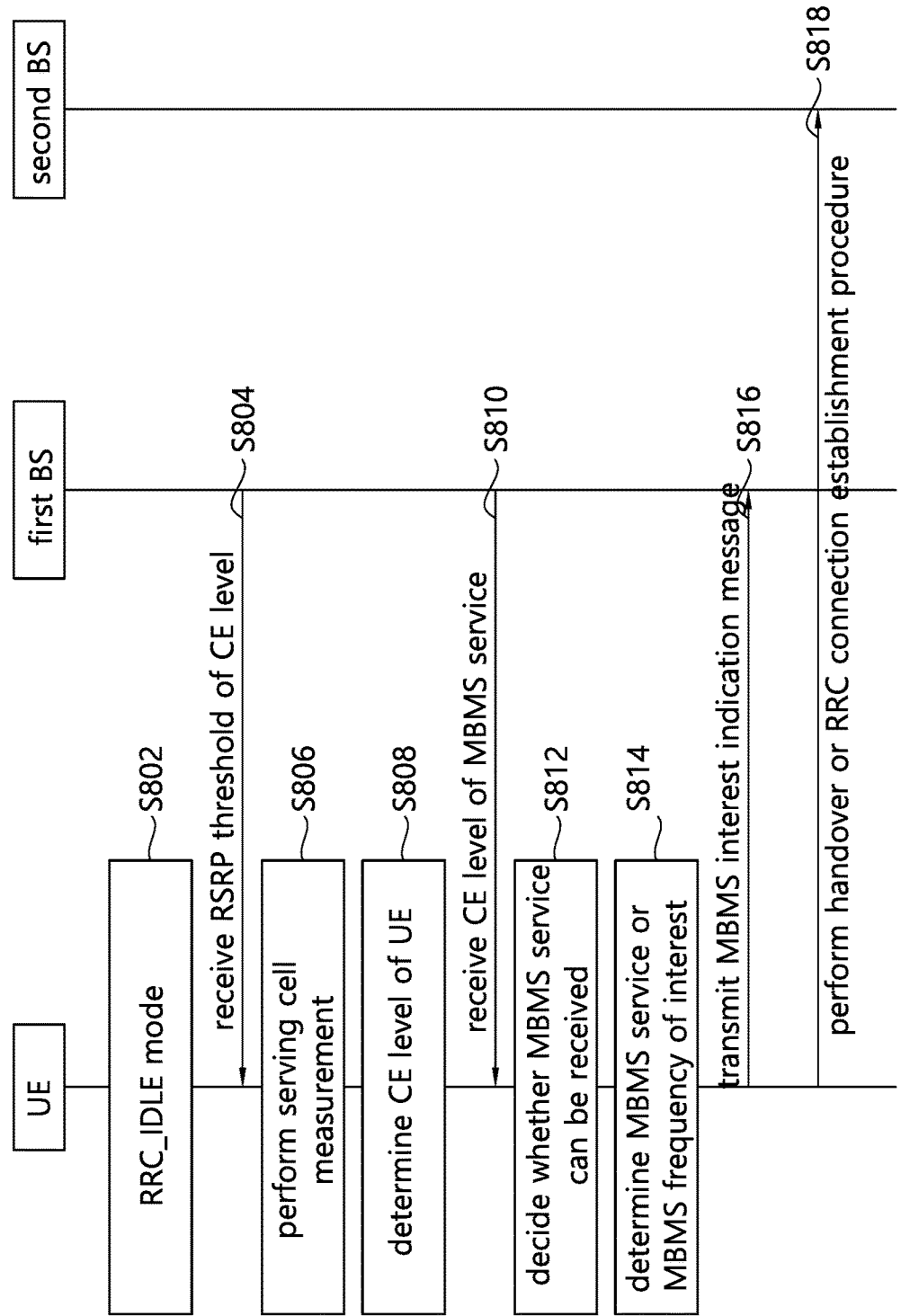
FIG. 8 is a flowchart for explaining a method of determining whether to have an interest in an MBMS.

FIG. 8 is a flowchart for explaining a method of determining whether to have an interest in an MBMS. The present embodiment may be performed by a UE located in enhanced coverage of a cell or a UE with bandwidth reduced low complexity (BL).

First, the UE may enter an RRC_IDLE state (S802). That is, the UE may not be connected to any specific cell. Thereafter, the UE may perform a handover or RRC connection establishment procedure with respect to a cell which provides the MBMS service.

The UE may receive a threshold from a network (a first BS of FIG. 8) (S804). An RSRP threshold may be set by the network, and each threshold provides a reference value for determining a CE level. The threshold may be called the RSRP threshold.

The UE may perform a measurement on the network (the first BS) (S806). By measuring the network, the UE may acquire a measured RSRP or RSRQ result.

The UE may determine a CE level of the UE (S808). The CE level of the UE may be an index indicating a UE location in a cell and signal quality of the UE in the cell. According to an embodiment, the UE may determine the CE level of the cell by comparing a measured RSRP result and a predetermined RSRP threshold.

According to an embodiment, if an RSRP threshold of a CE level 3 is set in an RRC layer and if the measured RSRP is less than the RSRP threshold of the set CE level, the UE may regard the CE level of the UE as a level 3.

Otherwise, if an RSRP threshold of a CE level 2 is set in the RRC level and if the measured RSRP is less than the RSRP threshold of the set CE level 2, the UE may regard the CE level of the UE as a level 2.

In addition, otherwise, if a measured RSRP is less than an RSRP threshold of a CE level 1 set in the RRC layer, the UE may regard the CE level of the UE as a level 1.

If not corresponding to all of the aforementioned cases, the UE regards the CE level of the UE as a level 0.

The UE may receive CE level information of the MBMS service of interest (S810). Specifically, the UE may receive MBMS CE level information corresponding to the MBMS service of interest. The CE level information of the MBMS service is an index indicating quality of a cell for providing the MBMS service, and may be determined by a network. The CE level information of the MBMS service may be provided for each MBMS service, TMGI, MBSFN area, or G-RNTI. For example, the CE level information of the MBMS service may be provided on an MBMS service basis. In addition, the UE may transmit the CE level information of the MBMS service via an MCCH or SC-MCCH channel Meanwhile, the CE level information of the MBMS service may include a repetition transmission count corresponding to the MBMS service. In this case, the UE may predict its repetition transmission count. As described below, the UE may decide whether the UE will receive the MBMS service on the basis of the repetition transmission count.

The UE may decide whether the MBMS service can be received (S812). The UE may decide whether the MBMS service can be received, by comparing the determined CE level and the received CE level information of the MBMS service. Specifically, the UE may determine whether the MBMS service can be received via multimedia radio bearer (MRB)/MBSFN transmission or SC-MRB/SC-PTM transmission. If the CE level information corresponding to the MBMS service is lower than the determined CE level of the UE, for example, if the CE level of the MBMS service is 1 and the CE level of the UE is 3, the UE may decide that the MBMS service cannot be received. In addition, if the CE level information corresponding to the MBMS service is higher than the CE level of the UE, for example, if the CE level of the MBMS service is 3 and the CE level of the UE is 1, the UE may decide that the MBMS service can be received.

The UE may determine an MBMS service of interest or an MBMS frequency of interest (S814). Specifically, the UE may determine an MBMS service, which is decided to be receivable, as the MBMS service of interest, or may determine a frequency, at which the MBMS service is provided, as the MBMS frequency of interest. According to an embodiment, the UE with the BL or the UE located in the enhanced coverage may determine a corresponding MBMS frequency as the frequency of interest if it is decided that at least one of MBMS sessions can be received via MRB or SC-MRB on the basis of a CE level (or repetition transmission count). In addition, according to an embodiment, the UE with the BL or the UE located in the enhanced coverage may determine the MBMS service as the MBMS service of interest if it is decided that the MBMS service can be received via the MRB or the SC-MRB on the basis of the CE level (or repetition transmission count).

Thereafter, the UE may transmit an MBMS interest indication message to a BS (e.g., the first BS of FIG. 8). According to an embodiment, the MBMS interest indication message may include information on the MBMS frequency of interest or the MBMS service of interest. If the UE decides that the MBMS service can be received from a specific cell, the UE may transmit to the cell a message indicating that the MBMS service can be received. Specifically, the UE may transmit to the BS an MBMS interest message indicating that the MBMS service can be received.

Thereafter, the UE may perform a handover or RRC connection establishment procedure with respect to a second BS corresponding to a target cell (S818). As such, the UE may transmit the MBMS to a cell capable of receiving the MBMS service and perform the handover or RRC connection establishment procedure with respect to the cell, thereby preventing the handover or RRC connection establishment procedure from being unnecessarily performed.

Thereafter, the UE starts MBMS service reception from the second BS.

Meanwhile, if the UE decides that the MBMS service cannot be received via the MRB or the SC-MRB, the UE may transmit to a corresponding cell a message indicating that the MBMS service cannot be received. According to an embodiment, the UE may transmit an MBMS interest indication message indicating that the MBMS service cannot be received. Accordingly, the UE may not perform the handover or RRC connection establishment procedure with respect to the cell. Thereafter, the UE may newly receive CE level information of the MBMS service of interest from another cell, and step S814 and its subsequent steps of the aforementioned procedure may be performed on the new cell.

By using a method of determining whether to have an interest in an MBMS according to another embodiment of the present invention, the UE may decide whether the MBMS service can be received based on a repetition transmission count of the UE and a repetition transmission count of the MBMS service, instead of s CE level of the UE and a CE level of the MBMS service.

Specifically, the UE may receive an RSRP threshold from a network. The RSRP threshold may be set by the network, and each threshold provides a reference value for determining, by the UE, the repetition transmission count.

The UE may perform a measurement on the network. Accordingly, the UE may acquire a measured RSRP or RSRQ result.

Specifically, the UE may predict the repetition transmission count of the UE. The repetition transmission count of the UE indicates a repetition count required for successful uplink transmission and downlink reception of the UE. The repetition transmission count may be predicted based on a measured RSRP and an RSRP threshold.

According to an embodiment, if an RSRP threshold of a repetition count A configured by an RRC layer is determined and if a measured RSRP is less than the RSRP threshold of the repetition count A, the UE regards that a required repetition count of the UE is #A.

Otherwise, if an RSRP threshold of a repetition count B configured by an RRC layer is determined and if a measured RSRP is less than the RSRP threshold of the repetition count B, the UE regards that a required repetition count of the UE is #B.

In addition, otherwise, if the measured RSRP is less than a RSRP threshold of a repetition count C configured by the RRC layer, the UE regards that the required repetition count is #C.

If not corresponding to all of the aforementioned cases, the UE regards that the required repetition transmission count is #D.

Meanwhile, in the present embodiment, the repetition count #A may be a greatest value, and #D may be a small value in an alphabetical order.

The UE may receive a repetition transmission count corresponding to an MBMS service. The repetition transmission count of the MBMS service indicates a repetition count required for successful uplink transmission and downlink reception of the MBMS service. Specifically, the repetition transmission count of the MBMS service may be provided for each MBSM service, TMGI, MBSFN area, or G-RNTI. For example, the repetition transmission count of the MBMS service may be provided on an MBMS service basis. In addition, the UE may transmit the repetition transmission count of the MBMS service via an MCCH or SC-MCCH channel.

The UE may decide whether the MBMS service can be received via MBSFN transmission/SC-PTM transmission, by comparing the repetition transmission count of the UE and the received repetition transmission count of the MBMS service. If the repetition transmission count corresponding to the MBMS service is less than the repetition transmission count required in the UE, for example, if the repetition transmission count of the MBMS service is 100 and the repetition transmission count of the UE is 200, the UE decides that the MBMS service cannot be received. In addition, if the repetition transmission count corresponding to the MBMS service is greater than the repetition transmission count required in the UE, for example, since the repetition transmission count of the MBMS service is 200 and the repetition transmission count of the UE is 100, the UE decides that the MBMS service can be received.

If it is decided that the UE is capable of receiving the MBMS service, the UE may determine an MBMS frequency of interest or an MBMS service of interest. Specifically, the UE may determine an MBMS service, which is decided to be receivable, as the MBMS service of interest, or may determine a frequency, at which the MBMS service is provided, as the MBMS frequency of interest.

Thereafter, the UE may transmit to the first BS an MBMS interest indication message indicating that the MBMS service can be received. Specifically, the MBMS interest indication message may include information regarding the MBMS frequency of interest or the MBMS service of interest. Thereafter, the UE may perform a handover or RRC connection establishment procedure with respect to the cell.

Meanwhile, if the UE decides that the MBMS service cannot be received via the MRB or the SC-MRB, the UE may transmit to a corresponding cell an MBMS interest indication message indicating that the MBMS service cannot be received. Accordingly, the UE may not perform the handover or RRC connection establishment procedure with respect to the cell. Thereafter, the UE may newly receive CE level information of the MBMS service of interest from another cell, and may decide whether the MBMS service can be received from a new cell.

Figure 9:
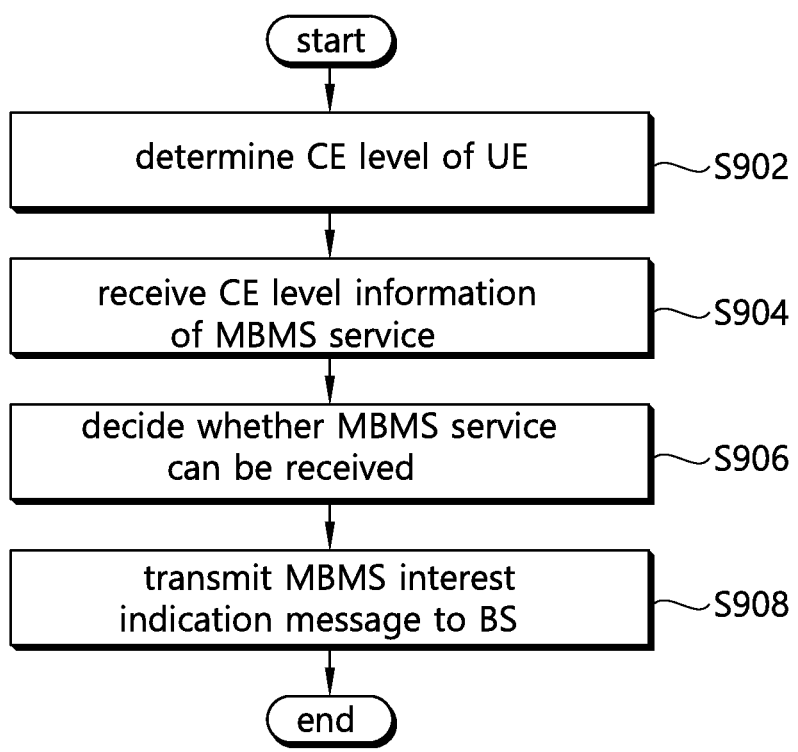
FIG. 9 is a flowchart for explaining a method of determining whether to have an interest in an MBMS according to an embodiment of the present invention.

FIG. 9 is a flowchart for explaining a method of determining whether to have an interest in an MBMS according to an embodiment of the present invention.

A UE may determine a CE level of the UE (S902). Specifically, the UE may determine the CE level of the cell on the basis of an RSRP threshold received from a network and a measured RSRP result. In an embodiment, if an RSRP threshold of a CE level 3 is set in an RRC layer and if the measured RSRP is less than the RSRP threshold of the set CE level, the UE may regard the CE level of the UE as a level 3.

The UE may receive CE level information of the MBMS service of interest (S904). The CE level information of the MBMS service is an index indicating quality of a cell for providing the MBMS service, and may be determined by a network. The CE level information of the MBMS service may be provided for each MBMS service, TMGI, MBSFN area, or G-RNTI. In addition, the CE level information of the MBMS service may be transmitted via an MCCH or SC-MCCH channel.

The UE may decide whether the MBMS service can be received, by comparing the determined CE level of the UE and the received CE level information of the MBMS service (S906). Specifically, if the CE level of the UE is lower than the CE level information of the MBSM service, the UE may decide that the MBMS service can be received via MBSFM transmission (MRB) or SC-PTM transmission (SC-MRB). In addition, if the CE level of the UE is higher than the CE level information of the MBMS service, the UE may decide that the MBMS service cannot be received.

The UE may transmit to a BS an MBMS interest indication message including information on the MBMS service of interest or the MBMS frequency of interest (S908). For this, the UE may determine the MBMS service of interest or the MBMS frequency of interest. Specifically, the UE may determine an MBMS service, which is decided to be receivable, as the MBMS service of interest, or may determine a frequency, at which the MBMS service is provided, as the MBMS frequency of interest. That is, the UE may transmit to the BS whether the MBMS service can be received through the MBMS interest indication message.

Meanwhile, the UE may inform that the MBMS service can be received through the MBMS interest indication message. In this case, the UE may perform the handover or the RRC connection establishment procedure with respect to a cell which has provided a repetition transmission count of the MBMS service.

Figure 10:
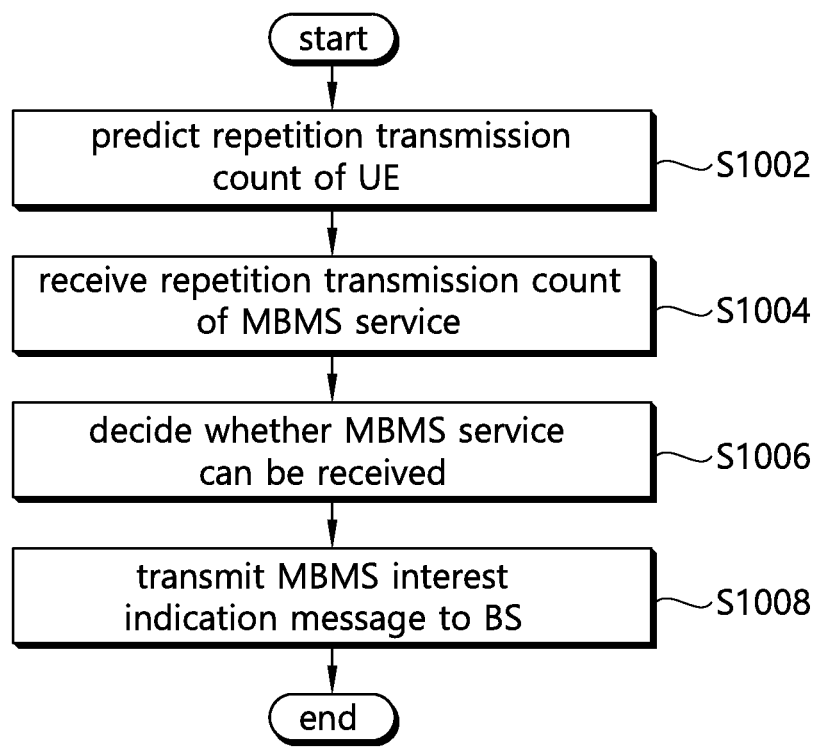
FIG. 10 is a flowchart for explaining a method of determining whether to have an interest in an MBMS according to an embodiment of the present invention.

FIG. 10 is a flowchart for explaining a method of determining whether to have an interest in an MBMS according to an embodiment of the present invention.

A UE may predict a repetition transmission count of the UE (S1002). Specifically, the UE may receive a threshold from a network, and may perform a measurement on the network. Hereinafter, the threshold may be called an RSRP threshold. Thereafter, the UE may predict the repetition transmission count of the UE. The repetition transmission count of the UE indicates a repetition count required for successful uplink transmission and downlink reception of the UE. In other words, the repetition transmission count may be predicted based on a measured RSRP and an RSRP threshold.

The UE may receive a repetition transmission count corresponding to the MBMS service (S1004). According to an embodiment, the repetition transmission count of the MBMS service may be provided for each MBSM service, TMGI, MBSFN area, or G-RNTI. For example, the repetition transmission count of the MBMS service may be provided on an MBMS service basis. In addition, the UE may transmit the repetition transmission count of the MBMS service via an MCCH or SC-MCCH channel.

The UE may decide whether the MBMS service can be received, by comparing the predicted repetition transmission count of the UE and the received repetition transmission count of the MBMS service (S1006). According to an embodiment, if the repetition transmission count corresponding to the MBMS service is less than the repetition transmission count required in the UE, the UE decides that the MBMS service cannot be received. In addition, if the repetition transmission count corresponding to the MBMS service is greater than the repetition transmission count required in the UE, the UE decides that the MBMS service can be received.

The UE may transmit to a BS an MBMS interest indication message including information on the MBMS service of interest or the MBMS frequency of interest (S1008). For this, the UE may determine the MBMS service of interest or the MBMS frequency of interest. Specifically, the UE may determine an MBMS service, which is decided to be receivable, as the MBMS service of interest, or may determine a frequency, at which the MBMS service is provided, as the MBMS frequency of interest. That is, the UE may transmit to the BS whether the MBMS service can be received through the MBMS interest indication message.

Meanwhile, the UE may inform that the MBMS service can be received through the MBMS interest indication message. In this case, the UE may perform the handover or the RRC connection establishment procedure with respect to a cell which has provided a repetition transmission count of the MBMS service.

Figure 11:
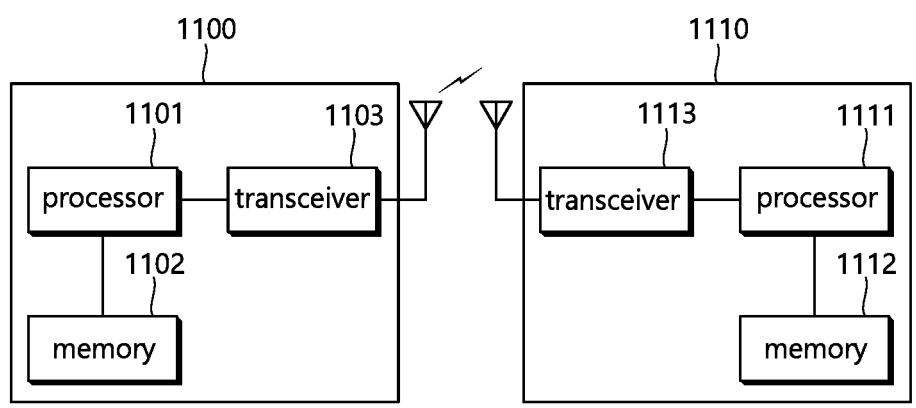
FIG. 11 is a block diagram illustrating a wireless apparatus in which an embodiment of the present invention can be implemented.

FIG. 11 is a block diagram illustrating a wireless apparatus in which an embodiment of the present invention can be implemented.

A BS 1100 includes a processor 1101, a memory 1102, and a radio frequency (RF) unit 1103. The memory 1102 is coupled to the processor 1101, and stores a variety of information for driving the processor 1101. The RF unit 1103 is coupled to the processor 1101, and transmits and/or receives a radio signal. The processor 1101 implements the proposed functions, procedures, and/or methods. In the aforementioned embodiments, an operation of the BS may be implemented by the processor 1101.

A UE 1110 includes a processor 1111, a memory 1112, and an RF unit 1113. The memory 1112 is coupled to the processor 1111, and stores a variety of information for driving the processor 1111. The RF unit 1113 is coupled to the processor 1111, and transmits and/or receives a radio signal. The processor 61 implements the proposed functions, procedures, and/or methods. In the aforementioned embodiments, an operation of the UE 1110 may be implemented by the processor 1111.

The processors 1111 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE) in a wireless communication system, the method comprising:
   determining a coverage enhancement (CE) level for the UE;
   receiving, from a network via a multicast control channel (MCCH) or a single-cell multicast control channel (SC-MCCH), multimedia broadcast multicast service (MBMS) CE level information including (1) a first CE level for a first MBMS service and (2) a second CE level information for a second MBMS service;
   deciding whether the first MBMS service and/or the second MBSM service are to be received via an Multimedia Broadcast multicast service Single Frequency Network (MBSFN) transmission or a Single-Cell Point-to-Multipoint (SC-PTM) transmission by comparing each of the first CE level and the second CE level with the determined CE level of the UE; and
   based on (1) the first CE level of the first MBMS service being less than the CE level of the UE and (2) the second CE level of the second MBMS service being greater than the CE level of the UE, transmitting, to the network, an MBMS interest indication message informing the network that the UE is to receive only the second MBMS service.

2. The method of claim 1, further comprising performing a handover or RRC connection establishment procedure with respect to a cell which has transmitted the MBMS CE level information.

3. The method of claim 1, wherein the CE level of the UE is determined based on reference signal received power (RSRP) measured in the UE.

4. The method of claim 1, wherein the MBMS CE level information is provided per Temporary Mobile Group Identity (TMGI), MBSFN area, or group radio network temporary identifier (G-RNTI).

5. A user equipment (UE) in a wireless communication system, the UE comprising:
   a memory; a transceiver; and a processor operationally coupled to the memory and the transceiver, wherein the processor is configured to:
   determine a CE level of the UE;
   receive, from a network via a multicast control channel (MCCH) or a single-cell multicast control channel (SC-MCCH), multimedia broadcast multicast service (MBMS) CE level information including (1) a first CE level for a first MBMS service and (2) a second CE level information for a second MBMS service;
   decide whether the first MBMS service and/or the second MBSM service are to be received via an Multimedia Broadcast multicast service Single Frequency Network (MBSFN) transmission or a Single-Cell Point-to-Multipoint (SC-PTM) transmission by comparing each of the first CE level and the second CE level with the determined CE level of the UE; and based on (1) the first CE level of the first MBMS service being less than the CE level of the UE and (2) the second CE level of the second MBMS service being greater than the CE level of the UE, transmit, to the network, an MBMS interest indication message informing the network that the UE is to receive only the second MBMS service.

* * * * *